United States Patent
Dacus et al.

[15] 3,680,294
[45] Aug. 1, 1972

[54] MOWER ATTACHMENT

[72] Inventors: Herbert R. Dacus, 1089 Madrid, Rockledge, Fla. 32955; Harry V. Christner, 795 Newfound Harbour Drive, Merritt Island, Fla. 32952

[22] Filed: Nov. 4, 1971

[21] Appl. No.: 195,577

Related U.S. Application Data

[63] Continuation-in-part of Ser. No. 127,280, March 23, 1971.

[52] U.S. Cl. .................................... 56/255, 56/320.1
[51] Int. Cl. .............................................. A01d 55/18
[58] Field of Search..........56/255, 320.1, 320.2, 17.4, 56/17.5

[56] References Cited

UNITED STATES PATENTS

| | | | |
|---|---|---|---|
| 2,906,082 | 9/1959 | Mathis | 56/320.1 |
| 2,934,882 | 5/1960 | Kaut, Jr. | 56/320.1 |
| 2,972,849 | 2/1961 | Ridenour et al. | 56/320.2 |
| 3,038,289 | 6/1962 | Cross | 56/255 |
| 3,098,337 | 7/1963 | Teachworth | 56/17.4 |
| 3,312,049 | 4/1967 | Walker | 56/255 |

*Primary Examiner*—Russell R. Kinsey
*Attorney*—Harvey B. Jacobson

[57] ABSTRACT

A mower attachment in the nature of a blade-enclosing guard or shield mounted on the housing in underlying relation to the blade. The blade, for maximum cutting efficiency, is positioned in spaced relation below the peripheral wall of the housing. The guard includes multiple laterally spaced parallel rods individually mounted, through mounting brackets, on the front and rear walls of the housing. Each rod is maintained by a single releasable clip with the rods providing multiple straight paths for the guided reception of the grass.

8 Claims, 9 Drawing Figures

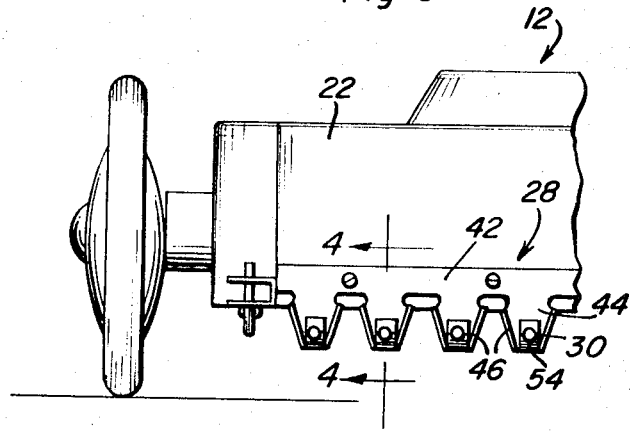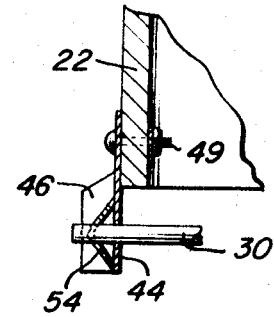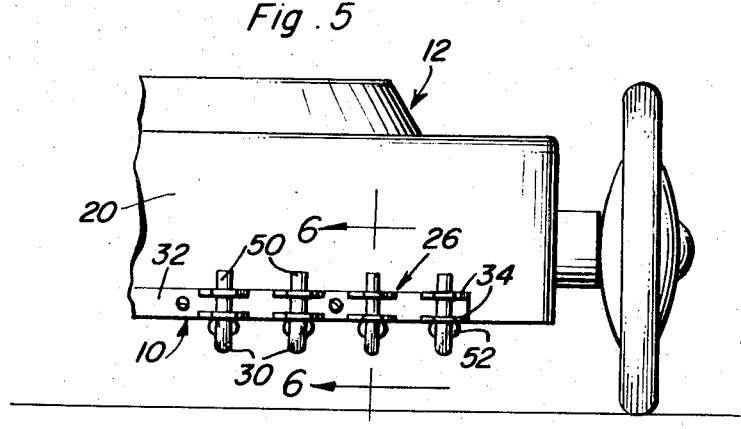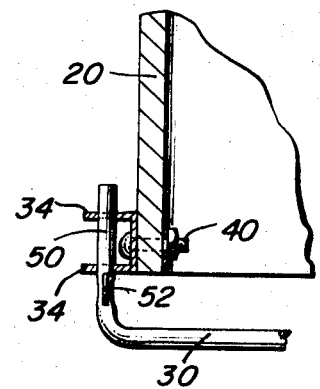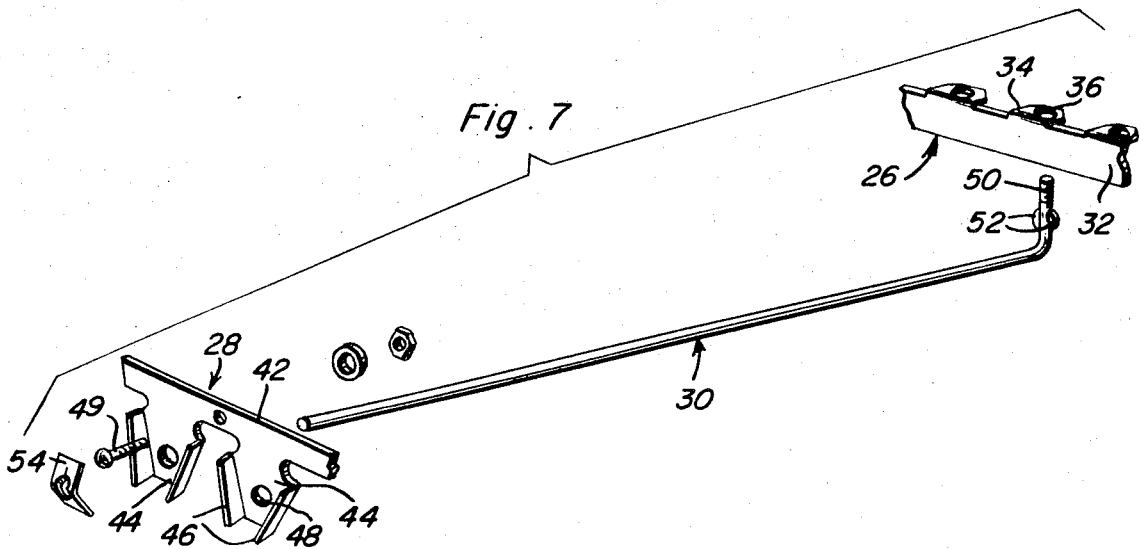

MOWER ATTACHMENT

This is a continuation-in-part of Ser. No. 127,280, filed Mar. 23, 1971 for "Mower Guard".

The present invention is generally concerned with rotary lawn mowers, and more particularly relates to a safety guard or shield which provides for a protective enclosure of the blade in conjunction with a grass guiding action and, through a blade orientation made possible by the shield, a highly efficient mower operation.

It is a primary intention of the instant invention to provide a structurally simple although highly unique safety shield or guard which is adapted for mounting on a majority of the commercially available rotary mowers in a manner which not only provides for a highly efficient protective enclosure for the blade, but also substantially increases the operational efficiency of the mower.

Other objects of the invention include the provision of a guard which can be economically produced, easily sold as a dismantled unit, simply mounted by the user and readily repaired through an inexpensive simple replacement of such individual components as may be damaged through use.

Basically, the attachment of the instant invention includes front and rear strip-like mounting brackets boltable to the front and rear walls of a lawn mower housing and a series of elongated laterally spaced parallel rods having the opposite ends thereof affixed to the brackets in underlying relation to the mower blade. The blade itself is to be mounted to operate in spaced relation below the peripheral wall of the housing whereby a maximum suction effect can be produced so as to efficiently draw the grass into the cutting area. The blade underlying guard rods provide an effective enclosure for the thus exposed blade. The individual rods are easily replaceable, being primarily secured by nut-like grippers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a partial rear elevational view of the mower with guard;

FIG. 4 is a cross-sectional detail taken substantially on a plane passing along line 4—4 in FIG. 3;

FIG. 5 is a partial front elevational view of the mower with guard;

FIG. 6 is a cross-sectional detail taken substantially on a plane passing along line 6—6 in FIG. 5;

FIG. 7 is an exposed perspective view of various components of the guard;

Figure 1:
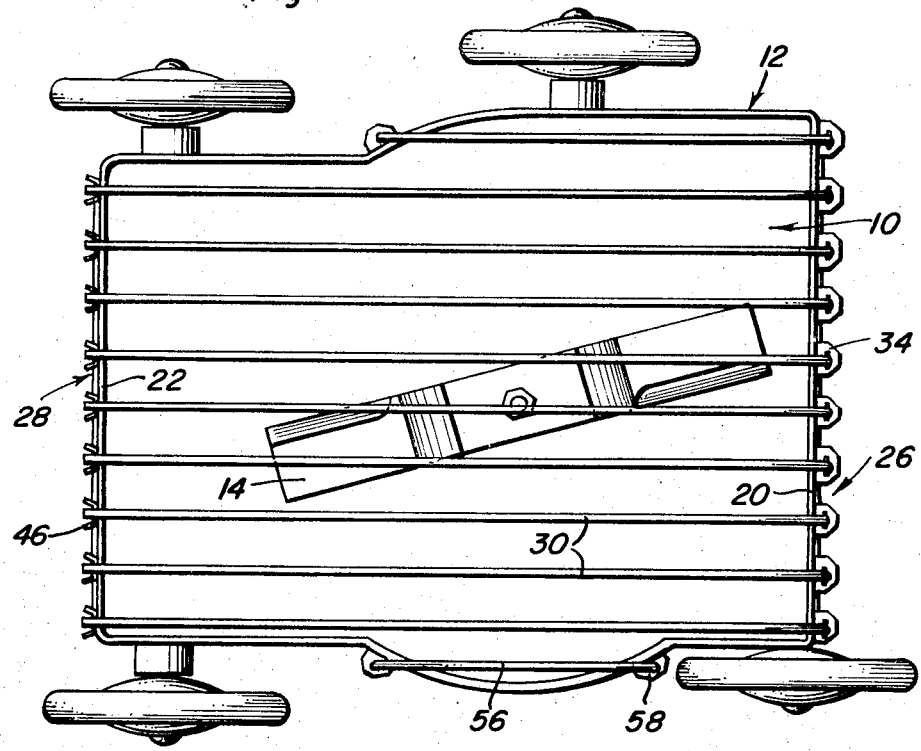
FIG. 1 is a bottom plan view of a mower with the guard of the instant invention mounted thereon.

Referring now more specifically to the drawings, reference numeral 10 is used to generally designate the safety guard with reference numeral 12 designating a rotary mower of basically conventional construction upon which the guard 10 is to be mounted.

The mower 12 includes a shaft driven rotary blade 14 and a blade covering housing 16 lying thereover. The housing 16 will conventionally include a flat deck 18 and depending equal height peripheral walls, including a front wall 20, a rear wall 22 and opposed side walls 24.

Figure 2:
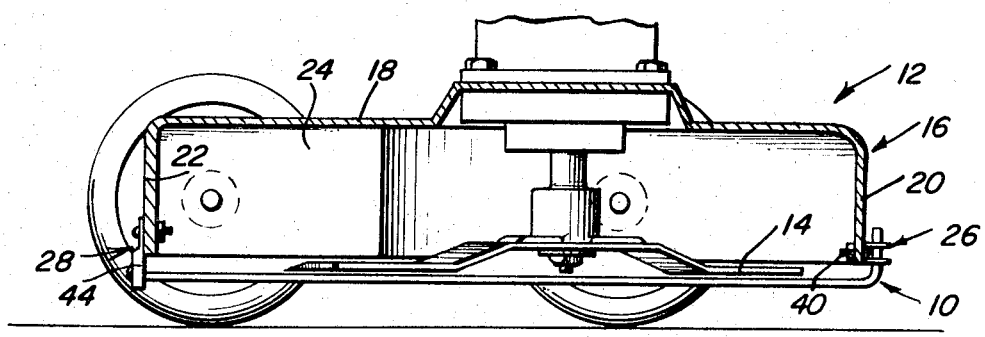
FIG. 2 is a longitudinal cross section through the guard mounting mower.

As will be best appreciated from FIG. 2, the blade 14, and in particular the cutting tips thereof, is orientated in spaced relation below the peripheral walls, this space normally being from one-eighth to 1 inch. This spacing is considered particularly significant in that the exposed blade creates a substantially improved upward drawing action or suction on the grass for a proper orientation thereof in the cutting area, thus providing for a neater cut and a much more efficiently operating unit. While, in the conventional mower, the exposure of the blade in this manner could create substantial hazards to both the blade and the operator, the unique guard 10 of the invention provides a protective, yet open, enclosure for the exposed blade with the blade enclosing guard in no way interfering with the cutting action of the blade or the reaction of the grass to the suction created by the blade. In fact, through the particular orientation of the components of the guard, as shall be explained presently, the cutting ability of the mower is in fact enchanced.

The guard or shield 10 itself includes front and rear mounting brackets 26 and 28 and straight elongated laterally spaced parallel blade protecting and grass guiding rods 30 extending therebetween.

Figure 8:
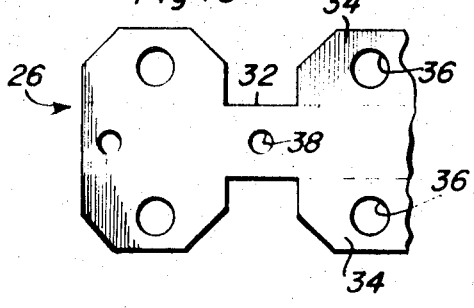
FIG. 8 is a view of a portion of the blank from which the front mounting bracket is formed.

The front bracket 26, formed from a blank as illustrated in FIG. 8, consists of an elongated strip 32 having integral outwardly projecting ears 34, arranged in longitudinally spaced pairs. The ears 34 of each pair are bent forwardly at approximately right angles to the strip 32 into aligned overlying relation with each other with the ears 34 of each pair having rod end receiving apertures 36 therethrough. The strip itself includes spaced bolt receiving holes or apertures 38 which receive mounting bolts and appropriate securing nuts 40 for a mounting of the bracket 26 on the exterior face of the front wall 20 adjacent the lower edge thereof. It will be appreciated that the front bracket 26 can be made of any length sufficient so as to accommodate the full length of the front wall 20.

Figure 9:
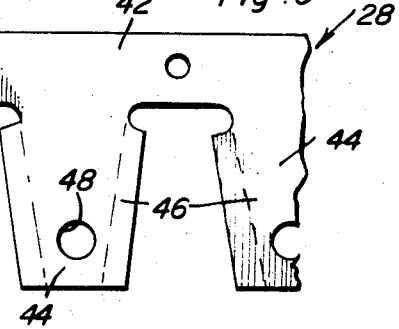
FIG. 9 is a view of a portion of the blank from which the rear mounting bracket is formed.

The rear bracket 28, formed from a blank as illustrated in FIG. 9, also includes an elongated periodically apertured strip 42 from which spaced laterally projecting lugs 44 extend. Each of the lugs 44 is of a generally tapered configuration and includes rigidifying angularly directed edge flanges 46 and a central rod receiving aperture or hole 48. The rear bracket 42, made in a length corresponding to the length of the rear wall 22, is mounted on the rear wall 22 by appropriate bolts and nuts 49 with the tapered flange reinforced lugs 44 depending vertically below the edge of the rear wall 22, the lugs 44 being orientated with the edge reinforcing flanges 46 rearwardly directed.

The rods 30 which provide the actual blade enclosing and grass guiding functions, are orientated in parallel to each other, extending from front to rear, between the brackets 26 and 28, the spacing between the rods 30 corresponding to that between the pairs of ears 34 on the front bracket 26 and the equally spaced depending lugs 44 on the rear bracket 28. Each rod 30 is straight with the forward end portion 50 thereof upturned at 90°. The upturned forward end of each rod 30 is received through the aligned apertures 36 of a pair of the ears 34 with the upward insertion of the rod end being limited by a pair of protuberances or projections 52 integrally formed on the rod end portion. The rear end portion of each of the rods 30 is in turn received through the hole 48 of the aligned lug 44 and is secured therein by a nut-like clip 54 of the type which includes a centrally apertured angled body so as to enable it to freely slide onto the rod end yet effectively resist any tendency to release or outwardly move thereon due to a spreading of the clip body through engagement with the corresponding lug 44. Such clips 54 and their manner of attachment are conventional and provide a convenient rapid means for both securing and, if necessary, releasing the individual rods 30. It will of course be appreciated that the arrangement of the brackets 26 and 28 is such so as to maintain the individual rods 30 horizontally orientated beneath the blade 14. By the same token, the positive gripping of each rod 30 through the associated clip 54 is sufficient so as to properly maintain the orientation of the rod 30 with the upturned forward end portion 50 thereof snugly received within the aligned ears. If so desired, in order to enhance the grip on the rod 30, without affecting the ease of mounting or removal of the rod 30, the ears 34 of each pair of ears can be so bent from the central strip 32 as to angle outwardly relative to each other, thus requiring a slight resilient compressing of the ears toward each other for the insertion of the rod end 50 with a release of the ears allowing them to spring slightly outward and thus frictionally lock the rod end 50.

The rods 30, while effectively enclosing and defining a guard or shield for the rotating blade 14, in no way affect the cutting ability thereof and in fact enhance the operation of the mower in that the straight front to rear rods positively align and guide the grass into the cutting area which, in conjunction with the improved suction effect resulting from the downwardly spaced blade, results in a cleaner and more efficient cutting action. It will be appreciated that the only portion of the guard which encounters the grass are the smooth rounded upturned rod ends which will merely tend to properly guide the grass into the rod defined channels.

The guide, constructed as described supra, is, while structurally simple, highly unique and efficient in operation. Further, should one or more of the rods 30 become damaged in use, such can be easily replaced without requiring a removal of the guard or any dismantling thereof other than a removal of the damaged rod.

Incidentally, with reference to FIG. 1, should an irregular configuration of the housing require it, additional edge rods 56 can be mounted through short supplemental brackets 58 formed generally similar to the brackets 26 or 28 as desired, each of the supplemental brackets 58 being individually bolted to the housing wall at the proper location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rotary lawn mower and safety guard therefor, said mower comprising a horizontal rotary blade, a housing, said housing including a deck overlying said blade in spaced relation thereabove, and peripheral depending front, rear and side walls, all of said walls terminating above said blade in outwardly spaced relation thereto whereby said blade rotates in a horizontal plane beneath the lower edges of the walls to develop an unencumbered suction effect on encountered grass, said guard comprising a plurality of straight horizontal rods underlying said blade and being in laterally spaced parallel relation to each other, and front and rear rod mounting means affixed to the front and rear walls of said mower housing.

2. The construction of claim 1 wherein said rods define continuous uninterrupted straight grass guiding paths between the front wall and the rear wall.

3. The construction of claim 2 wherein each of said rods includes an upturned forward end portion, said front mounting means including an apertured portion receiving each upturned forward rod end therethrough.

4. The construction of claim 3 wherein said front mounting means comprises an elongated strip, each apertured portion including upper and lower spaced ears projecting forwardly from said strip and including vertically aligned rod end receiving holes therethrough.

5. The construction of claim 4 wherein said rear mounting means comprises an elongated strip with longitudinally spaced lugs depending therefrom each of said lugs including a rod end receiving aperture therethrough, each of said rods including a rear end portion received through the lug aperture, and means securing each rod against withdrawal from the corresponding lug aperture.

6. The construction of claim 5 wherein each of said lugs includes opposed integral rearwardly directed reinforcing edge flanges.

7. The construction of claim 1 wherein said rear mounting means comprises an elongated strip with longitudinally spaced lugs depending therefrom each of said lugs including a rod end receiving aperture therethrough, each of said rods including a rear end portion received through the lug aperture, and means securing each rod against withdrawal from the corresponding lug aperture.

8. For use in conjunction with a rotary lawn mower, a safety guard therefor, said safety guard including a plurality of straight elongated laterally spaced parallel rods, each of said rods having a rear end portion and an upturned forward end portion, a front mounting bracket, said bracket including plural pairs of aligned upper and lower ears incorporating aligned apertures for a reception of the upturned forward end of the corresponding rod therethrough, and a rear mounting bracket including integral laterally spaced lugs, each having an aperture therethrough for reception of the rear end portion of the corresponding rod.

* * * * *